INVENTOR.
Robert M. Tuck
BY
a. M. Heiter
ATTORNEY

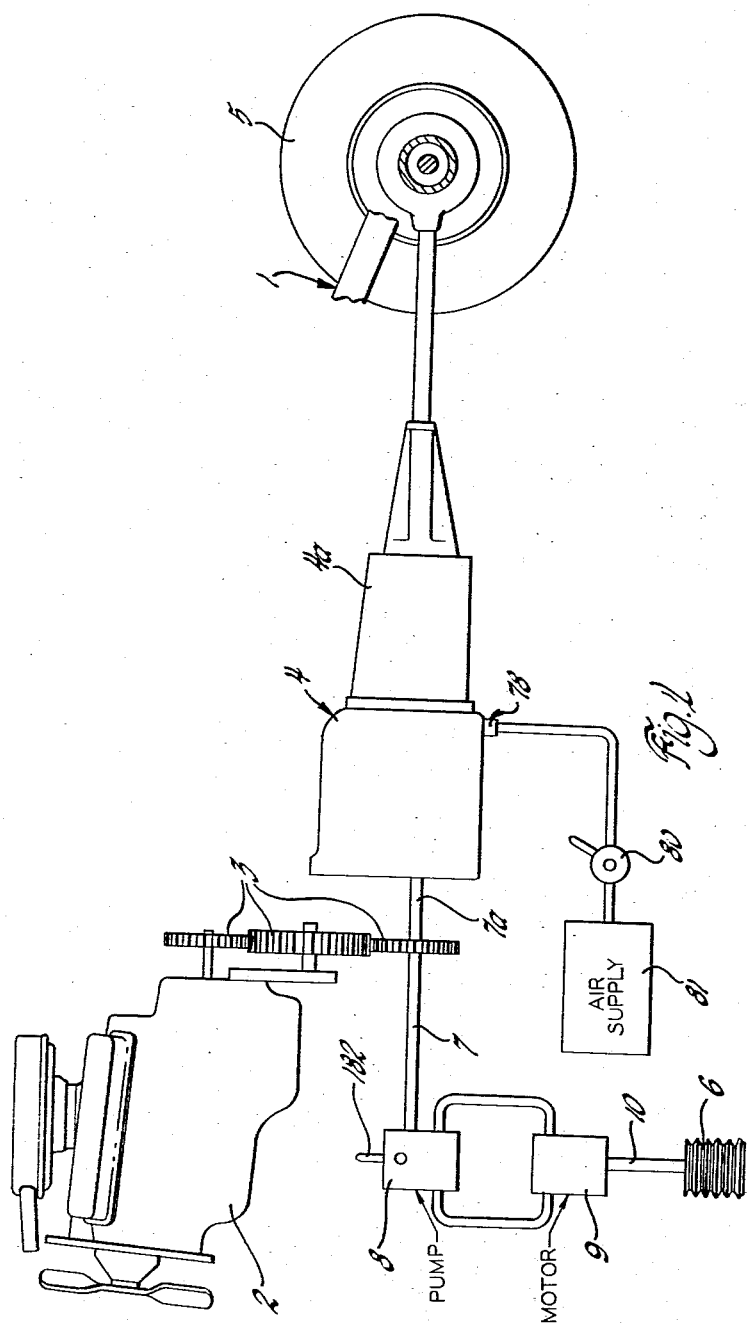

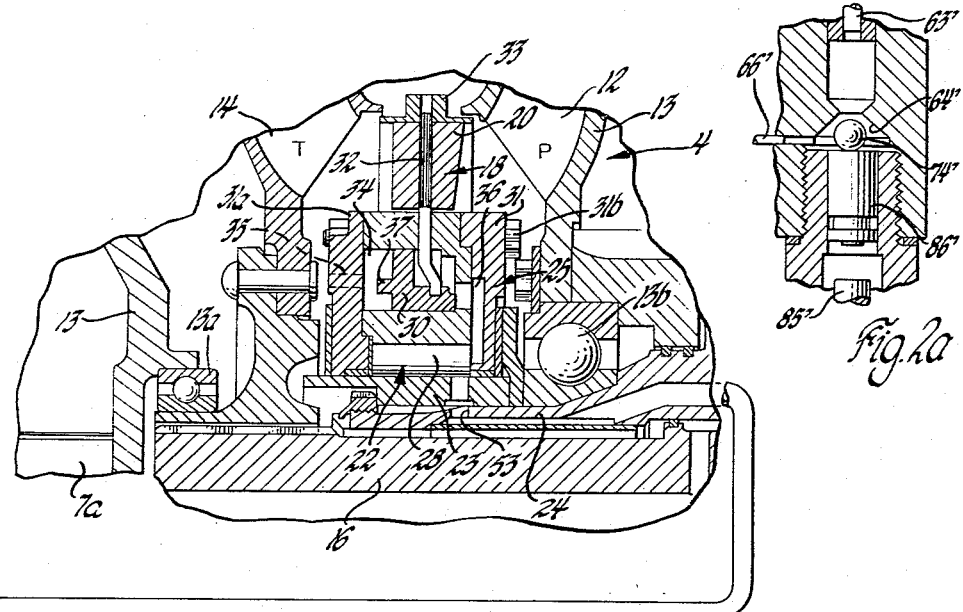
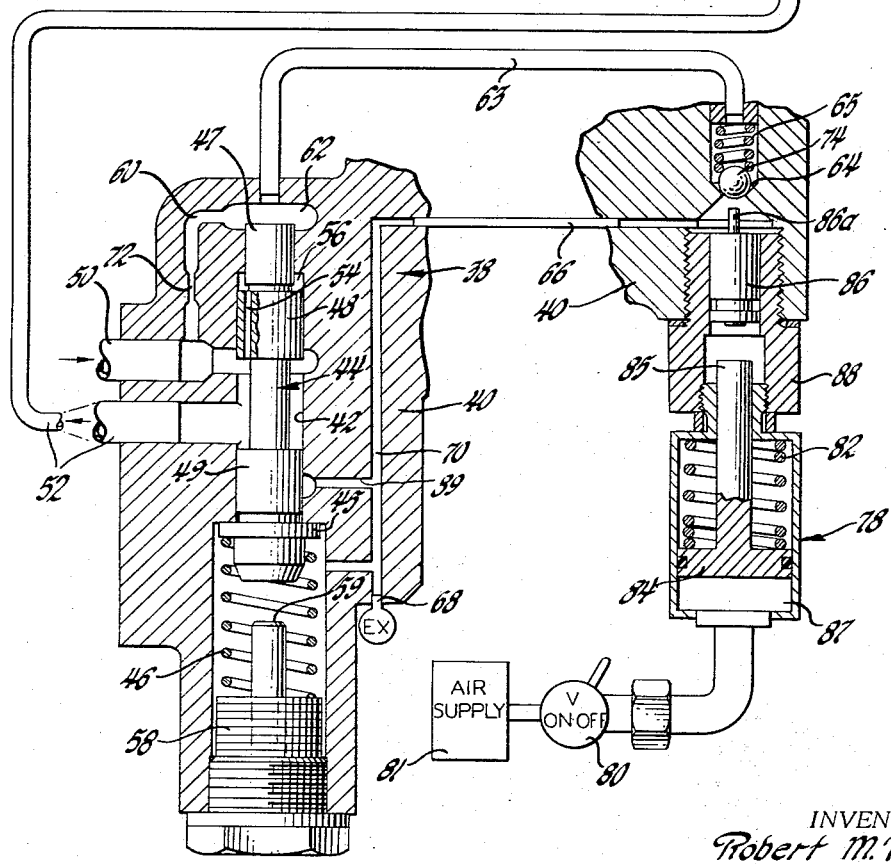

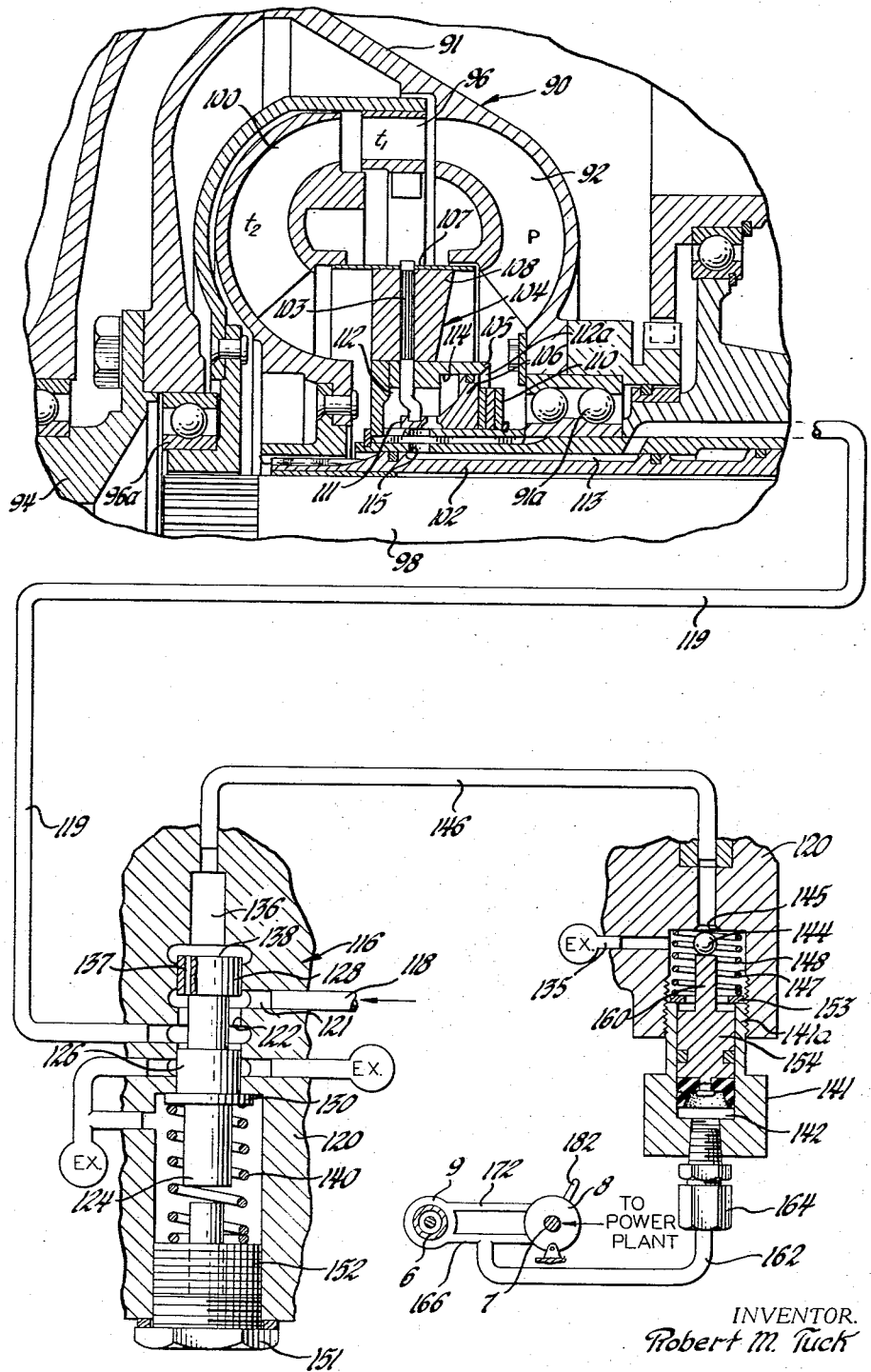

United States Patent Office 3,358,444
Patented Dec. 19, 1967

3,358,444
POWER TRANSMISSION
Robert M. Tuck, Indianapolis, Ind., assignor to General Motors Corporation, Detroit, Mich., a corporation of Delaware
Filed July 16, 1965, Ser. No. 472,483
44 Claims. (Cl. 60—54)

ABSTRACT OF THE DISCLOSURE

A power transmission for vehicles having a single input, a first output for vehicle drive and a second output for accessory drive with the vehicle drive including a torque converter having a stator with variable pitch blades. The stator blades are turned by a fluid actuated motor mechanism to a low angle position to condition the converter for high torque absorption capacity for vehicle drive or to a high-angle position for low torque absorption capacity for conditioning the transmission for combined vehicle and accessory drive with maintenance of full power engine speed. A valve mechanism, responsive to a high torque demand signal from the accessory or a signal from a manually operated signal device, controls the supply of fluid to the motor mechanism to condition the converter for low-capacity operation and the transmission for combined vehicle and accessory drive.

---

This invention relates to a power transmission and more particularly to a variable capacity torque converter transmission and torque converter controls in which the converter can be either conditioned for high capacity to absorb a high percentage of input power for driving a first output or conditioned for reduced capacity to absorb a lesser percentage of input power for driving the first output while diverting input power not absorbed to a second output.

In working vehicles a constant speed power plant is generally employed for purposes of economy. The power transmission of this invention which may be coupled to such a power plant involves a torque converter in which the capacity of the torque converter is varied to meet varied requirements for vehicle and implement drive. When both the vehicle and implement are being driven such as in a loading operation, the capacity of the converter is reduced by operation of controls related to implement torque demand to limit the power and that can be transmitted through the converter to the vehicle drive so that full power engine speed can be maintained and there will be sufficient power available to operate the vehicle and implement. When the only vehicle is being driven, such as for top speed travel, the capacity of the converter is increased for maximum vehicle performance.

The torque converter of this invention involves the use of variable pitch stator or reaction blades to vary the torque absorbing capacity of the converter. This converter has a design point with the stator blades in their low angle or open position to provide maximum torque ratio between converter pump and turbine and maximum capacity for a given converter input speed. When the stator blades are turned to their high angle, by operation of the controls, the capacity of the converter is reduced. This reduction of capacity limits the vehicle load on the power plant and excess engine power is available for implement drive.

Prior transmissions for combined implement and vehicle drive have included a low capacity torque converter mated with the vehicle power plant. Such converters are able to absorb only a limited amount of power developed by the power plant and power not asorbed by converter operation is therefore available for implement operation. However, when the implement is not being used only a part of the developed power can be transmitted to the vehicle drive wheels by virtue of the low capacity converter. Maximum performance for vehicle travel is accordingly low.

Furthermore, the use of a converter having only high torque absorption capacity does not insure proper operation of the vehicle or implement. In such cases the power plant cannot deliver sufficient power for simultaneous vehicle and implement drive. When the implement is used with such a converter the engine will slow down until the converter absorption reduces to a level where the design balance of the division of engine power between the converter and implement is established. The engine power is reduced due to engine slow-down or drag on the engine and power delivered to the implement often does not meet the requirement for implement operation or for implement and vehicle operation.

Prior utilization of variable pitch stator converters in power transmissions has generally been in connection with engines which operate at varying output speeds. Increase in pitch angle of the stator blades from low to high angle position increases the torque multiplication ratio of the converter. This permitted the engine to operate at a higher speed and a higher torque level. This prior utilization of variable pitch stators provided fast starts and acceleration for passing. For this reason the controls for such converters are related to vehicle performance.

An object of this invention is to provide a new and improved power transmission for vehicle and accessory drives.

Another object of this invention is to provide a new and improved engine and converter match in which the converter is conditioned for high capacity and matched with the engine for high vehicle performance and in which the converter is conditioned for low capacity and matched with the engine for combined vehicle and accessory operation.

Another object of this invention is to provide a new and improved variable capacity hydrodynamic torque converter for varying input power by varying the pitch of rotor blades in the converter for (1) low capacity operation for combined accessory and vehicle drive by a vehicle power plant, and (2) high capacity operation in which full power-plant output is absorbed by the converter for vehicle drive.

Another object of this invention is to provide a hydrodynamic torque converter having variable pitch stator blades in which the converter has maximum performance and high-torque-absorption capacity when the stator blades are in their low-angle position and in which the converter has a low torque-absorption capacity when the stator blades are in their high-angle position.

Another object of this invention is to provide a new and improved variable capacity torque converter having stator blades infinitely variable in pitch and in which the pitch of the stator blades is positioned by motor means, in turn positioned by new and improved control structure.

Another object of this invention is to provide a variable capacity torque converter transmission having new and improved hydraulic controls for selectively varying the pitch of the vanes and accordingly varying the power absorption capacity of the converter for vehicle drive or for combined vehicle and accessory implement drive.

Another object of this invention is to provide a new and improved variable capacity torque converter in which the capacity of the converter is automatically reduced upon a signal from a working implement operated by the vehicle in order to prevent lugging down of the engine during combined vehicle and implement drive demand.

These and other objects of the invention will be more apparent from the following specification and drawings showing the preferred embodiments of the invention.

In the drawings:

FIGURE 1 is a diagrammatic view generally illustrating this invention as employed in a working-type vehicle;

FIGURE 2 is a view diagrammatically illustrating a three-element torque converter in which the stator blades are variable in pitch and further illustrates a control system for controlling the pitch of the stator blades;

FIGURE 2a is a view illustrating a modification of the control system of FIGURE 2;

FIGURE 3 is a view similar to FIGURE 2, diagrammatically illustrating a multi-turbine torque converter including variable pitch stator blades and further illustrates a control for positioning the stator blades;

Figure 4:
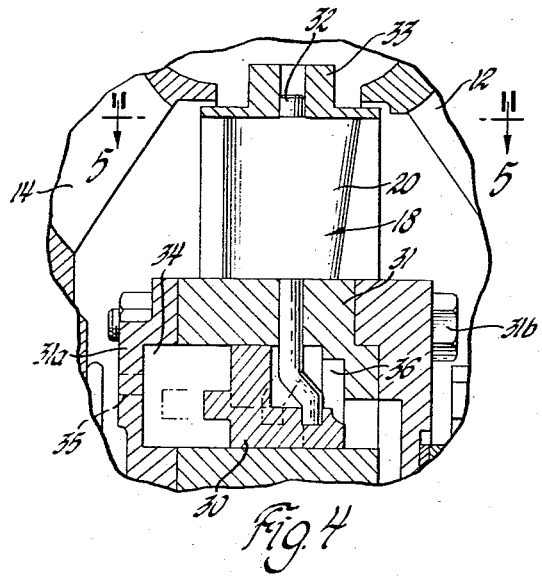
FIGURE 4 is an enlarged view of a portion of the converter of FIGURE 2.

FIGURE 1 discloses a working vehicle 1 having a constant speed power plant 2 which drives the vehicle through spur gears 3, torque converter 4, coupled ratio change unit 4a and drive wheels 5. The power plant is also adapted to drive an implement or accessory 6 through power take-off shaft 7, hydraulic pump 8, and coupled hydraulic motor 9. The pump 8 may be of fixed or variable capacity, as desired. As shown, the vehicle drive through the converter and accessory drive through the pump and motor provides first and second power paths both directly powered by the prime mover. This invention insures that power demand by the accessory does not lug down the power plant, causing vehicle and/or accessory stall.

*Three element converter and controls*

A hydrodynamic torque converter 4 includes a bladed pump 12 driven through rotatable pump housing 13 by an input shaft 7a. The pump housing has a front wall formed with an annular shoulder supporting bearing 13a which in turn rotatably supports the front end of output shaft 16. Conventional bearings, including bearing 13b, rotatably support the pump. The pump when operating powers a bladed turbine 14 which is splined to the output shaft 16. The stator 18 having a plurality of rotatable blades 20, further described below, is located between the turbine and pump.

As shown in FIGURE 2, the stator is preferably mounted on a one-way brake or freewheeler 22 mounted on race 23 which is in turn splined to ground sleeve 24. The stator also includes hub assembly 25 which forms a housing for a purpose which will hereinafter appear. The stator blades redirect the converter fluid exiting from the turbine back into the pump for increasing torque multiplication when the converter is in the torque-multiplying phase of operation. When the converter is in the coupling phase, the fluid forces acting on the rear of the stator blades causes the stator to freewheel in the direction in which pump and turbine are revolving. In this condition the converter acts as an efficient fluid coupling.

An annular piston 30 is housed for reciprocal movement within an annular cylinder in the hub assembly 25 which includes end plates 31 and 31a secured by bolts 31b. The piston has a circular groove therein in which the ends of a plurality of crank arms 32 are seated. These crank arms have straight portions which extend through suitable openings in the hub assembly and have their upper ends rotatably received in stator shroud 33. The stator blades are securely fastened to the crank arms between the shroud and the hub assembly as illustrated.

Figure 5:
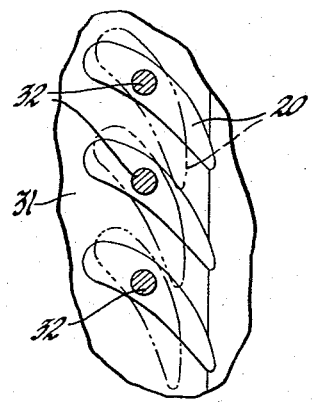
FIGURE 5 is a view taken on line 5—5 of FIGURE 4.

As will appear below, the axial travel of the piston within the hub assembly will simultaneously rotate the stator blades between high-angle and low-angle positions with respect to the centerline of the converter. The piston divides the cylinder or interior of the hub assembly into two separate chambers 34 and 36. The converter is so designed that in the low-angle, solid-line stator position of FIGURE 5 the converter performance and power-absorption capacity are high. Thus, the pump at low stator blade angle will absorb virtually all of the torque which is developed by the power plant. As the stator blades are turned to the high-angle position, such as shown in phantom lines in FIGURE 5, the moment of momentum of oil entering the pump is changed in a direction to reduce the capacity of the pump. With reduced converter capacity the pump will absorb a reduced portion of engine power, thereby leaving the remainder to be utilized for other purposes, such as operating accessory 9. From the above, it will be appreciated that converter capacity is a function of stator blade angle.

The stator blades are normally retained in the low-angle, high-converter-capacity position by action of converter outlet pressure on piston 30 in chamber 34 through orifices 35 in plate 31a. As will appear below, chamber 36 is exhausted at this time and piston 30 is held in its extreme right position in FIGURE 4 and the stator blades are at their low-angle position as shown in full line in FIGURE 5.

The piston can be moved to the left by pressurizing chamber 36 with a regulated pressure sufficient to overcome the converter pressure force within chamber 34 which tends to oppose this movement. When the piston is moved to its extreme left position in which piston stop 37 contacts end plate 31a, the crank arm 32 will be turned and the stator blades 20 will be swung around to their high-angle, low-capacity position. This is the phantom line position illustrated in FIGURE 5.

The stator control valve 38 controls the movement of piston 30 and thereby the position of the stator blades. This valve includes a valve body 40 having a bore 42 therein which a valve spool 44 is longitudinally movable. This spool may be biased into an extreme position by calibrated coil spring 46 which contacts stop shoulder 45 integrally formed on the spool. The spool is further formed with a reduced end 47 and control lands 48 and 49. When land 48 of the spool is moved away from main pressure line 50, the main pressure can reach chamber 36 via the bore 42, conduit 52 and passage 53 formed in the converter. Line 50 may be a branch of line 83 of the transmission control of United States Patent No. 3,241,399, issued Mar. 22, 1966, to Mark E. Fisher et al. As will appear below, the spool 44 acts as a regulator valve to regulate main line pressure into the chamber 36. When a predetermined regulated pressure is admitted to chamber 36, the piston 30 will be moved to the left to move the stator blades to high-angle, low-capacity position.

As shown in FIGURE 2, the land 48 of the valve spool is provided with an orifice 54 which leads into a chamber 56 formed by the bore 42 and established by the end of land 48. Pressure acting against the end of the land 48 will oppose the pressure of calibrated spring 46. If this pressure is greater than the pressure of the spring, the spool valve will be forced downwardly in FIGURE 2 to accordingly restrict pressure line 50, reducing the pressure in line 52 and chamber 36 depending upon amount of restriction. A drop in pressure in control chamber 56 will cause spring 46 to push spool 44 upwardly so that line 50 is more fully opened and a higher pressure can be established in chamber 36.

By reducing the capacity of the converter through adjustment of the stator blades to their high-angle position, the converter will require a reduced amount of developed engine power for converter operation. The power not absorbed by the converter can be then utilized in the implement drive without draining power away from the converter. By this capacity reduction, full power engine speed may be maintained.

Figure 9:
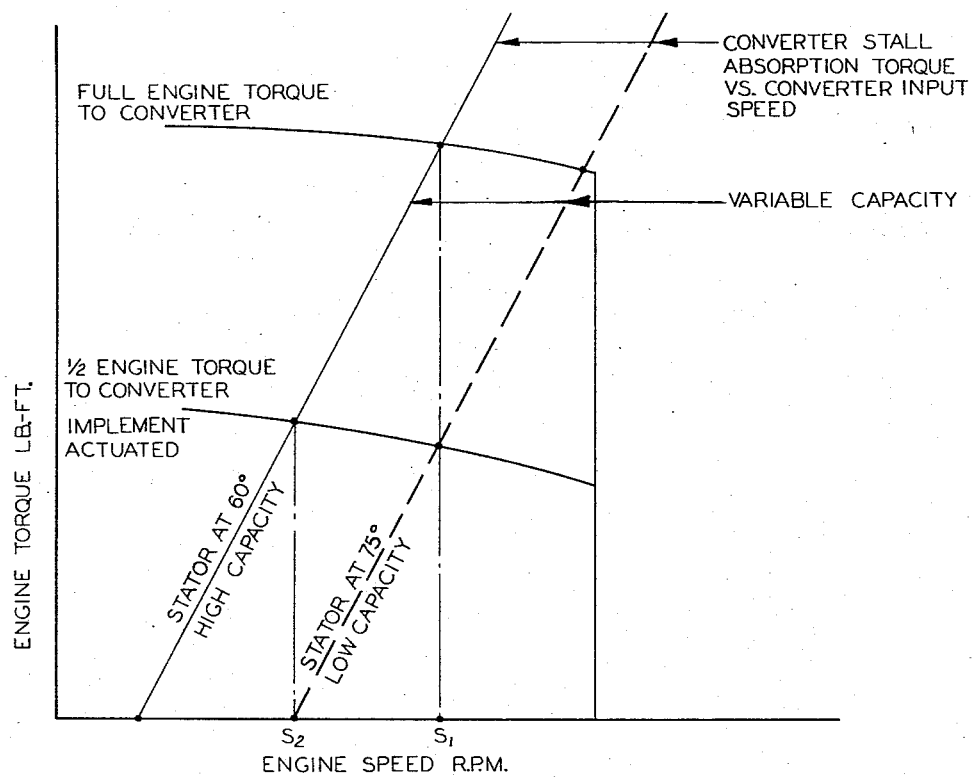
FIGURE 9 is a graph of engine torque v. engine speed showing the results of positioning the stator blades in low and high angle.

This is illustrated in FIGURE 9 which is a plot of engine torque v. engine speed for both high and low-capacity conditions. With the stator blades set at an example 60° low-angle, high-capacity position, the high capacity stall torque curve intersects the full engine torque curve at engine speed $S_1$. Full engine torque is available to the converter since there is no other utilization of engine torque. However, when the implement is driven a part of the engine torque will be required to operate the implement. If, for example, one-half engine torque is utilized by the implement, one-half engine torque is available for the converter. This is illustrated as the lower engine-torque-curve in FIGURE 9. If the stator blades are not switched to their low capacity position, the engine speed will drop to speed $S_2$ as indicated by the intersection of the stall torque curve for the high-capacity converter with the lowered engine torque curve.

However, by switching the stator blades to an example high-angle 75° low-capacity position, a new stall torque curve is established. This stall torque curve intersects the low engine-torque-curve at the engine speed $S_1$. By switching the stator pitch for low-capacity operation engine speed is maintained. Accordingly the engine will not be lugged down unless the implement requires more than one-half of the engine torque.

When the stator is working, the stator blades provide a ground effect between the turbine and pump. The converter fluid directed into the stator blades from the turbine during torque multiplication exerts a turning force on the stator blades. The center of this force is below the center of the crank arms 32 shown in FIGURE 5 and operates through the crank arms 32 and piston 30 to tend to open the stator blades. This force opposes the force of the control pressure which tends to close the stator blades. The center of the forces tending to open the stator blades moves further away from the center of the crank arms and therefore the moment of force increases as the stator blades are closed and the spacing between the blades is progressively restricted.

Figure 8:
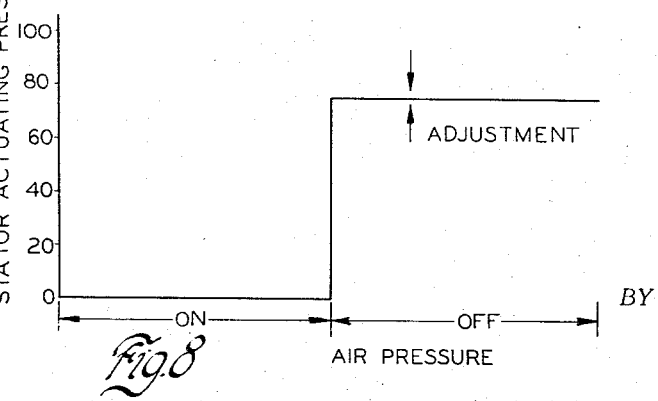
FIGURE 8 is a graph which illustrates the adjustment of the stator blade control valve.

If the piston bias force tending to close the stator blades is controlled, an equilibrium position of the stator blades can be obtained in which the fluid forces on the stator blades and in the chamber 34 balance the regulated control pressure in chamber 36. By this means converter capacity can be controlled. FIGURE 8 discloses such control by the regulation of the pressure in chamber 36. By increasing the pressure in this chamber through the addition of washers 58 between screw 59 and the end of spring 46, the actuating pressure in chamber 36 will rise and the piston 30 will be moved into its extreme left position in which stop 37 contacts plate 31a. The stator blades are then in their maximum closed position. By removing washers 58, the actuating pressure in chamber 36 will be lowered and the piston 30 will seek an equilibrium position in which the stator blades are in a partially closed position. Since the capacity of the converter is a function of stator blade angle and the stator blade angle can be controlled by varying the regulated pressure in chamber 36, the capacity of the converter can be effectively regulated. If desired, pistons of varying axial dimension may be used or other suitable adjustable stops employed to control maximum high and low-angle blade position.

Line 60 which formed in valve body 40 is connected to main line pressure 50 leads into a chamber 62 into which the reduced end 47 of valve spool 44 extends. This chamber is connected by a conduit 63 to an exhaust line 66 through a restricted opening 64. Line 66 is connected to exhaust 68 through passage 70. Restriction 64 is larger than restriction 72 and there will be no appreciable fluid pressure in chamber 62 as long as restriction 64 is open and a reduced amount of fluid from the main line 50 can pass into conduit 60 and through the restriction 64 into exhaust line 66.

As shown in the preferred embodiment of FIG. 2, a ball 74 is normally biased by a captured coil spring 65 into a ball seat formed in restriction 64 in valve body 40. The ball in the seated position blocks the exhaust of fluid from pressure chamber 62 and allows that chamber to be pressurized by line 50 pressure. FIG. 2 further discloses a coupling member 88 threadedly secured to the valve body having a bore therein which series plunger 86 is movably mounted. This plunger has a ball contact, or extension 86a, for a purpose described later.

An air piston 78 is threadedly secured to the coupling 88 and includes a reciprocally movable piston 84 having a rod 85 adapted to contact and move the plunger 86 and attached extension 86a. A coil spring 82 in the air piston normally biases the piston in a direction away from plunger 86 and normally keeps piston rod 85 from contacting plunger 86. Chamber 87 in the air piston is connected to the vehicle air supply 81 by a suitable conduit and pressure from air supply 81 into chamber 87 is controlled by a manually operable on-off valve 80.

It will be appreciated that in operation of the FIG. 2 embodiment with the air supply off, ball 74 biased by spring 65 closes chamber 62 so that chamber 62 is pressurized. Valve spool 44 is force downwardly by chamber 62 pressure against the opposing bias of spring 46 until stop 59 is contacted by the end of the spool 44. Control pressure line 52 and connected piston chamber 36 is then exhausted since in this valve position land 48 blocks line 50 and opens line 52 to exhaust 68 through passage 89. When chamber 36 is exhausted, the relatively high converter outlet pressure moves the piston 30 to the right in FIG. 2 and thereby moves the stator blades to their low-angle, high-capacity position. It will be noted that in the event of the loss of air pressure from air supply 81 the stator blades will be positioned in their low-angle, high-capacity position.

For low converter capacity operation, valve 80 is opened and the air piston moves plunger 86 and its extension 86a toward the ball 74. The extension then lifts the ball off its seat against the bias of spring 65. This exhausts chamber 62 and permits valve spool 44 to regulate pressure in chamber 36. With regulated control pressure in chamber 36 piston 30 moves to the left and the connected stator blades 20 are turned to their high-angle, low-capacity position. This regulated control pressure will be opposed by converter outlet pressure through opening 35 and fluid pressure on stator blades 20. As described above, by selecting various control pressures for chamber 36 piston 30 may be moved to various selected positions in the piston housing and thereby move the stator blade to an infinite number of high and low-angle positions to accordingly vary the capacity of the converter.

FIGURE 2a is a modification of the FIGURE 2 structure and accordingly will be described in connection with that structure and with similar parts shown in FIG. 2a primed. Primarily, the embodiment of FIG. 2a is concerned with modified means for closing chamber 62 to exhaust 68. In this modification the ball 74' is adapted to be seated in restriction 64' blocking line 63', as in the FIG. 2 structure. However, it will be noted that the ball is on the opposite sides of the restriction. When pressure from air supply 81 is admitted to chamber 87 by opening of valve 80 piston 84 will be moved against the opposing bias of spring 82 and piston rod 85' moves plunger 86' to secure ball 74' in its seat. With ball 74' seated, the spool valve 44 operates as described in connection with FIG. 2 and the stator blades are moved to their open high-capacity position. With pressure of air supply 81 cut off, the piston 84 will be biased by spring 82 to its FIG. 2 position. Ball 74' will be unseated to exhaust chamber 62' through exhaust line 66'. The spool valve 44 will then regulate control pressure to chamber 36 to move the stator blades to their closed low-capacity position, also as described in connection with FIG. 2.

*Twin turbine converter and controls*

Figure 6:
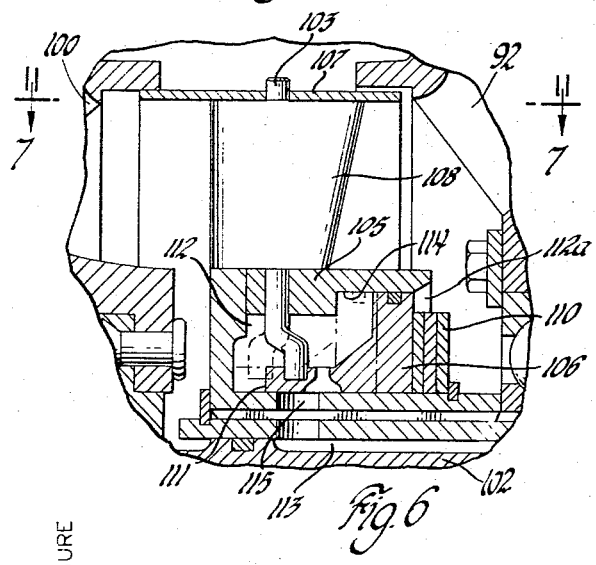
FIGURE 6 is an enlarged view of a portion of the converter of FIGURE 3.

In the FIGURE 3 embodiment, there is shown a multi-turbine torque converter 90 which may be utilized in place of torque converter 4 of FIGURE 1. This converter includes housing 91, rotatably mounted on suitable bearings 91a, and 91b driven by input shaft 94. The converter also includes bladed pump 92, first turbine 26 rotatably supported by bearing 96a and connected to drive first drive shaft 98, and second turbine 100 for driving the second drive shaft 102. The stator 104, located between the second turbine 100 and the pump 92, includes reaction blades 108 rigidly secured to cranks 103. These cranks are rotatably mounted in the hub assembly 105 and have one end rotatably supported in outer shroud 107 and the other end mounted in a circular groove in annular piston 106. This piston is movably mounted within an annular cylinder 114 formed in hub assembly 105 and provides chambers 112 and 112a. Reciprocal movement of this piston will rotate the cranks 103 to appropriately turn the stator blades, as illustrated in FIGURES 6 and 7.

Figure 7:
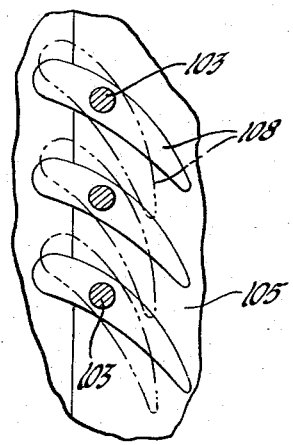
FIGURE 7 is a view taken along line 7—7 of FIGURE 6.

Movement of the piston 106 to the left by action of converter pressure and force of Belleville spring 110 to the phantom line position of FIGURE 7 will turn the stator blades 108 to their extreme high-angle, low-capacity position. In this piston position stop 111 on the piston contacts wall 113 of hub assembly 105. Movement of the piston to the right to its full-line position will turn the stator blades to their low-angle, high-capacity position. This latter movement is accomplished by exerting full control pressure in the chamber 112 behind the piston, which pressure produces sufficient force to overcome the opposing forces produced by the converter pressure plus the force of spring 110 in chamber 112a. Control pressure is admitted to chamber 112 through a suitable opening in the piston, a passage 113 in the converter and through opening 115 in the hub assembly. Passage 113 is hydraulically connected to a stator control valve 116, described below, by line 119.

The valve 116 of FIGURE 3, which is somewhat similar to the valve 40 of the FIGURE 2 embodiment, is connected to the main line 118 which may also be a branch of line 83 of the transmission control of Patent No. 3,241,399. This valve includes a valve body 120 having a bore 122 in which valve spool 124 is reciprocally mounted. The spool has lands 126 and 128, as well as a positioning stop shoulder 130. As shown, the entrance 121 of the main line 118 into chamber 122 of the valve is controlled by land 128. Regulated main line pressure can be exerted in chamber 112 through line 119 by regulating the degree of opening of entrance 121, as described hereinafter.

The valve spool 124 operates as a regulator valve in a manner similar to that of the first embodiment. When chamber 136 is pressurized through an orifice 137 in land 128; the fluid force on the end 138 of the valve spool will oppose the force of coil spring 140 which contacts the shoulder 130 of the valve spool 124. Under these conditions the valve spool will regulate and the pressure from main line 118 will be reduced in line 119 and chamber 112 to a low regulated pressure which permits converter inlet pressure and force from Belleville spring to move the piston to the left in FIGURE 3 and the stator blades 108 to their high-angle, low-capacity position for accessory operation.

If the pressure in the main line 118 increases, the regulator valve will adjust to maintain the desired low regulated pressure in line 119 and chamber 113. Thus, increased pressure in chamber 136 will move the spool valve generally downwardly against spring 140 to partially close main pressure line 118 to reduce the pressure in line 119 and chamber 112. If the pressure in line 118 decreases, the pressure in chamber 136 will decrease and the spring 140 will force the valve to the position shown in FIGURE 3 in which the opening of line 118 into bore 122 is at its maximum. By this means the controlled low regulated pressure will be admitted into the piston chamber 112; high-angle is obtained, converter capacity is low and sufficient power is available for implement drive.

The stator blades may be varied from their extreme high-angle position to other positions to vary converter capacity by appropriately changing the load height of spring 140, as described in the first embodiment. Thus if it is desired to increase the low capacity of the converter additional washers 152 are added between screw 151 and the end of the spring 140 and the pressure in chamber 115 will be increased accordingly. Piston equilibrium will be reached before its previously described, high-angle position in which stop 111 contacts wall 113 and the low converter capacity will be accordingly increased.

Due to the fact that converter inlet pressure is low and somewhat variable, the spring force must, as a practical matter, be larger than the fluid force on the stator blades to prevent such fluid force from moving piston 106 alone.

For adjustment of piston 106 to different positions in piston housing 114 and corresponding adjustment of the pitch of the stator blades, the sum of the fluid force on the stator blades 108, the converter inlet biasing force and the force of the Belleville spring must describe a force-curve that increases on movement of the stator blades from high to low-angle positions. Thus, different regulated control pressures in chamber 112 provide different piston equilibrium positions and different stator blade positions to vary the capacity of the converter in accordance with the control pressure.

If the pressure in chamber 136 is not established it will be seen that full main line pressure will be conducted by line 119, passage 113 and opening 115 into chamber 112. This moves the stator blades to the low-angle, high-capacity for vehicle drive when the power requirements of the implement are low. This high capacity enables the converter to absorb a large percentage of the torque developed by the engine and apply it to the drive wheels for vehicle performance.

Special means are employed for controlling the chamber 136 in the valve 116. As shown, a piston housing 141 is suitably fastened into a portion of the valve body as by screw threads 141a. A ball 144 is adapted to be seated in a seat 145 in the valve body 120 to close off the conduit 146 which connects the chamber 136 to the piston housing 141. This valve body is formed with a bore 147 in which spring 148 is seated. A washer 153 is mounted at the other end of the spring and is adapted to be contacted by a piston 154. The ball 144 can be maintained in its seat when piston rod 160 contacts ball 144 and holds the ball in its seat.

A pressure line 162 has one end connected to the coupling member 164 which is threaded into the upper portion of the piston housing. This pressure line extends to an output line 166 which hydraulically connects the variable displacement hydraulic pump 8 to the fixed displacement hydraulic motor 9 while return line 172 returns the fluid from the motor back to the pump. When the implement calls for increased output by the motor, the output of the pump may be increased by operation of control 182 and the increased pressure from the pump will be experienced in chamber 142. When this pressure is greater than the opposing pressure of spring 148, the ball 144 will be held in its seat by piston rod 160. Pressure builds up in chamber 136 through orifice 137 and allows the spool 124 to regulate low pressure into chamber 112. This allows the stator blades to swing to their high-angle, low-capacity position for accessory operation.

As best illustrated in FIGURE 1, accessory 6 and the vehicle drive wheels 5 may be simultaneously driven by power plant 2. Control handle 182 is used as an on-off control for a constant displacement pump 8 and to vary the stroke of the pump when a variable capacity pump is employed. By varying the pump stroke of the latter-mentioned pump the rate of fluid delivery to the motor is controlled. The greater the amount of fluid delivered to the motor by the pump the faster the motor drive shaft 10 rotates. Thus the accessory 6 can be made to operate at varying speeds. If desired, a reversible pump or a reversing valve can be utilized in the transmission from the power plant 2 to the accessory 6 to reverse direction of implement motion. When the accessory is not being utilized control handle 182 can be used to adjust the stroke of pump-8 to zero so that motor 9 and accessory 6 will not be driven.

When the pump 8 is powering the motor 9 and more torque is demanded by the motor 9 to operate the accessory 6, the pump will increase its output pressure. System pressure between pump and motor will go up and when sufficient to overcome spring 148, chamber 136 will be established and piston 106 will move to the left in FIGURE 3 to cause the stator blades to switch to their high-angle position. This reduces the capacity of the converter thereby allowing the engine 2 to drive both implement 6 and drive wheels 5 without reduction in engine speed.

When the implement is not being utilized or does not require high torque, the system pressure between pump and motor is not sufficient to compress spring 148 and the spring will move piston 154 to its retracted position shown in FIGURE 3. Chamber 136 will not be fluid-tight since the fluid can be exhausted through the orifice formed by seat 145 into exhaust line 135. Spool 126 allows full main line pressure in chamber 112 and the piston 106 moves to the right for low-angle, high-capacity operation.

With the several embodiments which have been disclosed, applicant has provided a new and improved torque converter and controls which may be efficiently and successfully used on vehicles having an accessory such as a power-driven shovel or blade, and in which the prime mover will be able to manipulate the accessory without a reduction in engine speed. Applicant's invention provides power priority to both implement and vehicle drive from one power source. In one of the embodiments there is automatic response to a signal directly from the accessory and this signal results in the turning of the stator blades into their high-angle, low-capacity position. When the signal is removed the stator blades will be turned automatically to their low-angle, high-capacity position. In another embodiment illustrated, the signal is under the direct control of the vehicle operator so that he may manually open or close a valve to accordingly adjust stator position and converter capacity.

In both cases, through adjustment of regulated control pressure, the angular setting of the stator blades at high-angle may be controlled and converter capacity is thereby controlled.

It will be appreciated that changes and modifications may be made to the specifically disclosed embodiments of applicant's invention as particularly shown and described and that applicant's invention is not to be limited by the disclosure but only by the claims which follow.

I claim:

1. In a power transmission, input power means and a plurality of output means, a variable capacity torque converter driven by said input means and drivingly connected to a first of said output means, means operatively coupling said input power means and a second of said output means, said converter including a rotor having a plurality of bladed members shiftable between high and low angle positions with respect to the center line of said converter for controlling the capacity of said converter, fluid actuated motor means within the confines of said torque converter and interior of said bladed members having one side open to converter pressure for shifting said bladed members to a low blade angle position to provide a high capacity converter for absorbing a high percentage of input power and driving the first of said output means, said motor means being operative to shift said bladed members to a high blade angle position for decreasing the capacity of said converter and to thereby divert an increased portion of output power from said converter to the second of said output means, and valve means for controlling fluid pressure to said motor means to control the position thereof and the angular position of said bladed members.

2. The transmission of claim 1 wherein said valve means is a regulator valve which includes adjustable means for selectively varying the pressure to one side of said motor means to control the position thereof and the angular position of said bladed members.

3. The transmission of claim 1 including spring means for exerting a force on said motor means counter to the force exerted by fluid pressure from said valve means.

4. The transmission of claim 1 wherein said valve means provides means for exhausting fluid from one side of said motor means to permit fluid pressure of said converter to exert a force on said motor means and said bladed members to open said bladed members to a predetermined low angle position.

5. In combination in a vehicle, a working implement, a torque converter transmission, power plant means for supplying power to said transmission and to said implement, said torque converter having a rotor with variable pitch blades movable between high and low angles to vary the capacity of said converter, said blades when in low angle position providing a high capacity torque converter for absorbing substantially all of the power of said power plant, fluid actuated piston means having one side thereof open to converter fluid pressure for simultaneously moving said blades to either said high or said low angle, pressure regulating valve means for controlling the supply of fluid to the other side of said piston means, manually controlled signal means for signaling and conditioning said valve means to effect movement of piston means in one direction and move said blades to a high angle position to reduce the capacity of the converter and also to effect movement of said piston means in an opposite direction and move said blades to a lower angle position to increase the capacity of the converter, said power plant maintaining power plant speed and responding to converter capacity reduction by supplying power to simultaneously drive said vehicle and implement.

6. In a power transmission, input power means and first and second output means, a variable capacity torque converter, operatively connected to said input power means for transmitting power to said first output means, said second output means being operatively connected to said input power means, said converter including a reaction device having a plurality of bladed members shiftable between high and low-angle positions with respect to the center line of said torque converter, motor means for shifting said bladed members to a high-blade angle for reducing the capacity of the converter and for shifting said bladed members to a low-blade angle for increasing the capacity of said converter, a housing for said motor means, said housing being divided by said motor means to provide first and second chambers, one of said chambers being open to converter pressure, a valve means for exhausting said first chamber to permit converter pressure to move said motor means in a first axial direction to simultaneously shift said bladed members to a low-angle position and for regulating pressure to said first chamber to move said motor means in an opposite axial direction to simultaneously shift said bladed members to a high-angle position, said converter when conditioned for increased capacity operation being capable of absorbing a high percentage of input power to condition said transmission for drive of said first output and when conditioned for reduced capacity operation being adapted to absorb a lower percentage of input power to thereby condition said transmission for combined drive of said first and second output means without reduction of speed of said input power means.

7. In a transmission, constant speed input power means and first and second output means, a variable capacity torque converter operatively connected to said input power means for transmitting power to said first output means, said second output means being operatively connected to said input means, control means for varying the capacity of said torque converter, said converter including a rotor having a plurality of blades movable from an open position for high-converter capacity to a closed position for low-converter capacity to condition said transmission for drive of both of said output means without reduction in speed of said input power means, fluid actuated positioning means movable in a first direction for turning said blades to an open position and movable in a second direction for turning said blades toward a closed position, one side of said positioning means being opened to converter pressure, fluid pressure regulating control valve means operatively connected to the other side of said positioning means for regulating a control pressure thereto to effect movement of said positioning means in said second direction and means operatively connected to said control valve means for changing the regulated pressure of said valve means to control the amount of movement of said positioning means and the low capacity of said converter.

8. In combination, a variable capacity hydrodynamic torque converter and control means for varying the capacity of said torque converter, said converter including a stator having a plurality of blades movable from an open high-capacity position toward a closed low-capacity position, said converter having maximum efficiency when the stator blades are at an open high-capacity position, motor means for turning said stator blades to high and low-capacity position, a control valve for said motor means, said valve including a regulator valve for regulating a control pressure operative on one side of said motor means tending to close said blades and opposing converter pressure operative on the other side of said motor means tending to open said blades.

9. The device in claim 8 wherein means operatively connect said motor means to each of said blades and wherein the force of fluid circulating within said converter on said blades progressively increases as said blades are progressively closed thereby exerting a progressively increasing force on said motor means in an axial direction opposing said control pressure.

10. In combination, a variable capacity hydrodynamic torque converter and control means for varying the capacity of said torque converter, said converter including a stator having a plurality of blades movable from an open high-capacity position toward a closed low-capacity position, said converter having maximum efficiency when the stator blades are at an open high-capacity position, motor means for turning said stator blades to high and low-capacity position, a control valve for said motor means, said valve including a regulator valve for regulating a high control pressure operative on one side of said motor means tending to open said blades opposing converter fluid pressure operative on the other side of said motor means tending to close said blades.

11. The device in claim 10 wherein means operatively connect said motor means to each of said blades and wherein the force of converter fluid circulating within said converter acts on said blades to tend to move said motor means in a first axial direction opposing converter fluid pressure acting on said motor means.

12. In a variable capacity torque converter, a reactor having a plurality of blades movable between an open low-angle position and a substantially closed high-angle position for varying the capacity of said converter, motor means for shifting said blades to said positions, a housing for said motor means, said housing being divided by said motor means into first and second chambers, a source of fluid pressure, means operatively connecting said source to said first chamber, a regulator valve interposed in said last-mentioned means between said source and said first chamber for controlling the pressure in said first chamber, said regulator valve including a spool member, a calibrated spring exerting a force in a first direction on said spool member, a third chamber adapted to be pressurized by fluid under pressure from said source operative on an end of said spool member to oppose the spring pressure, means for adjusting the pressure of said spring to vary the regulation of pressure from said source into said first chamber, valve means for relieving pressure from said third chamber to deactivate said regulator valve permitting said motor to move said blades to their low-angle open position.

13. The variable capacity converter of claim 12 wherein said last-mentioned valve means includes a control member movably mounted in a seat and wherein contact means are provided for selectively holding said control member in said seat.

14. In a variable capacity hydrodynamic torque converter, a reactor having a plurality of blades movable between an open low-angle position to a substantially closed high-angle position for varying the torque absorption capacity of said converter, motor means for shifting said blades to said positions, a housing for said motor means, said motor means separating said housing into a plurality of chambers, a source of fluid pressure, fluid-conducting means connecting said source to one of said chambers in said motor housing, regulator valve means interposed in said fluid-conducting means for regulating pressure in said last-mentioned chamber, said valve means including a valve spool, spring means biasing said spool in one direction, said spool regulating pressure into said one chamber in said motor housing, said valve spool having one end projecting into a control chamber formed in said regulator valve means, movable closure means for closing said last-mentioned chamber thereby permitting controlled pressure from said source to bias said spool against the action of said spring means, means permitting said spring means to bias said spool to a regulating position whereby said motor means moves said blades to one of said positions, and adjustment means in said regulator valve means to vary the regulated pressure in said one chamber in said housing to adjust the low-capacity position of said blades.

15. The device of claim 14 wherein spring means normally biases said closure means to a seated position, contact means movable in one direction for unseating said closure means permitting said valve means to regulate pressure into said one chamber in said motor housing.

16. The structure of claim 14 wherein said valve means regulates pressure into said one chamber in said motor housing when said closure means has been moved into position establishing said last-mentioned chamber.

17. The structure of claim 14 wherein plunger means are provided to bias said closure means to a seated position, said closure means when seated permitting pressure from said source to move said spool and exhaust said one chamber in said housing allowing converter inlet pressure to move said motor means and position said blades to low-angle position.

18. The device of claim 17 wherein a spring member is provided to oppose axial movement of said motor means decreasing the angle of said stator blades and wherein the said spring provides an increasing force on such axial movement.

19. In a variable capacity hydrodynamic torque converter, a reactor having a plurality of blades movable between an open low-angle position to a substantially closed high-angle position for varying the torque-absorption capacity of said converter, motor means for shifting said blades to said positions, said reactor providing a housing for said motor means, said motor means separating said housing into first and second chambers, a source of fluid pressure, fluid-conducting means connecting said source to said first chamber, said second chamber being connected to converter fluid pressure, a regulator valve means interposed in said fluid-conducting means for controlling pressure in said first chamber, said valve means including a bore having a spool longitudinally movable therein, control lands on said spool, a fluid passageway through one of said lands, said passageway connecting said source to a chamber established at one end of said bore by one of said lands, said last-mentioned chamber when pressurized by said source biasing said spool in a first longitudinal direction, a spring member biasing said spool in an opposite direction, a chamber formed in said valve means at one end of said spool, ball means for opening and closing said last-mentioned chamber, a seat for said ball means, contact means for maintaining said ball member in said seat to close said last-mentioned chamber, a passageway to connect said last-mentioned chamber to said source to pressurize said last-mentioned chamber to move said spool against said spring member to exhaust said first chamber, said chamber when exhausted permitting said converter pressure to move said motor means and said blades to an open position, said motor means when said first chamber is charged with predetermined regulated pressure being axially movable to turn said blades to a closed position, means to vary the force of said spring member to accordingly vary the position of said motor means and the closed position of said blades.

20. In a variable capacity multi-turbine torque converter, a reactor having a plurality of blades movable between open low-angle positions to substantially closed high-angle positions for varying torque-absorption capacity of said converter, motor means for shifting said blades to said low and high-angle positions, said reactor providing a housing for said motor means, said motor means separating said housing into first and second chambers, a source of fluid pressure, fluid-conducting means connecting said source to said first chamber, said second chamber being connected to converter fluid pressure, a spring biasing said motor means in an axial direction, regulator valve means coupled to said fluid-conducting means for controlling pressure in said first chamber, said valve means including a bore having a spool member longitudinally movable therein, said spool including control lands thereon, a fluid passageway through one of said lands connecting said source to a chamber established at one end of said bore by one of said lands, said last-mentioned chamber when pressurized by said source biasing said spool against the action of said spring, said regulating valve regulating a low pressure into said first chamber when said control chamber is established, a spring member biasing said spool in an opposite direction, ball means for closing said last-mentioned chamber, contact means automatically responsive to a predetermined load for contacting said ball, said valve when regulating a predetermined low pressure to said chamber allowing said motor means to move said blades to a high-angle position, said valve including means to vary the height of said spring to change the regulated pressure in said first chamber to establish differing high-angle positions of said blades.

21. In combination in a vehicle, a working implement and a torque converter transmission, a power plant for operating said implement and said torque converter transmission, said vehicle being driven by said torque converter transmission, means operatively connected to the converter and implement and responsive to a torque demand signal from said implement unaffected by power plant speed to lower torque converter capacity enabling said power plant to simultaneously drive said vehicle and implement without substantial reduction in power plant speed.

22. In combination in a vehicle, a working implement and a torque converter transmission, said torque converter having a stator with blades movable between a high and low angle, a power plant for operating said implement and said transmission, means operatively connected to said stator blades and said implement and responsive to a signal generated from said implement and unaffected by power plant speed to move said blades to high-angle position to lower converter capacity enabling said power plant to simultaneously drive said vehicle through said transmission and said implement without substantial reduction in power plant speed.

23. In combination in a vehicle, a working implement and a torque converter transmission, a power plant for said implement and said torque converter transmission, said torque converter having a stator with blades movable between high and low angles to vary the capacity of said torque converter, control means for moving said blades, manually controlled signal means operatively connected to said control means and said implement for signaling said control means to move said blades to a high angle position to lower converter capacity in response to implement torque demand unaffected by power plant speed, said power plant responding to converter capacity reduction by simultaneously driving said vehicle and implement without substantial reduction in power plant speed.

24. In combination in a vehicle, a working implement and a torque converter transmission, coupled hydraulic pump and motor units for driving said implement, a constant-speed power plant for operating said pump unit and said transmision, means hydraulically connected to said pump and motor units responsive to signal from said implement to lower converter capacity enabling said power plant to simultaneously drive said vehicle and implement without substantial reduction in power plant speed.

25. In combination in a working vehicle having a substantially constant-speed power plant for driving an implement and a transmision, a torque converter forming part of said transmission, said torque converter including a multi-turbine hydrodynamic torque converter, and a stator having a plurality of blades movable between high and low-angle positions for varying the torque-absorption capacity of said converter, a longitudinally movable motor for moving said stator blades between said high and low-angle positions, a housing for said motor, said housing including a control chamber, fluid-conducting means connecting one of said control chambers to a source of fluid pressure, a control valve interposed in said conducting means for regulating pressure into said control chamber, said motor turning said blades to different high-angle positions when said pressure in said control chamber is varied and turning said blades to a low angle when substantially full pressure is admitted to said chamber, said control valve including a spool member for controlling fluid from said source, a regulating spring operating on one end of said spool, a chamber in said control valve receiving the other end of said spool, movable means for opening and closing said chamber, piston means for contacting said last-mentioned means to effectively close said chamber, said piston means being responsive to torque demand of said implement for actuating said piston to thereby close said chamber in said control valve, said chamber when closed permitting said valve to regulate low pressure into said motor chamber to permit converter pressure to move said blade to a high-angle, low-capacity position for implement operation.

26. In combination in a working vehicle having a substantially constant-speed power plant for driving an implement and a transmission, a torque converter forming part of said transmission, said torque converter including a stator having a plurality of blades movable between high and low-angle positions for varying the torque-absorption capacity of said converter, a motor for moving said stator blades between said high and low-angle positions, said stator providing a housing for said motor, said motor dividing said housing into a plurality of chambers, fluid-conducting means connecting one of said chambers to a source of fluid pressure, a control valve interposed in said conducting means for regulating pressure into said one chamber, said motor turning said blades to a high-angle position when said pressure in said chamber is regulated and turning said blades to low angle position when said one chamber is exhausted, said control valve including a spool member for controlling fluid from said source, a regulating spring biasing said spool in one direction, a control chamber in said control valve receiving an end of said spool member, fluid-conducting means connecting said source to said control chamber, movable means for opening and closing said control chamber, piston means for contacting and holding said last-mentioned means in position to close said control chamber, said piston means being responsive to control means for actuating said piston to thereby close said chamber in said control valve, said control chamber when closed permitting said valve to exhaust said one chamber to permit converter pressure to move said blade to a low-angle, high-capacity position.

27. In combination, a power plant, an implement, first power transmitting means connecting said power plant to said implement, second power transmitting means connected to said power plant including a variable capacity hydrodynamic torque converter, control means for varying the capacity of said torque converter, said converter including a rotor having a plurality of blades movable from an open equal-angle position for high converter capacity to a closed equal-angle position for low converter capacity, positioning means forming part of said control means and axially movable in one direction for turning said blades to an open position and axially movable in an opposite direction for turning said blades toward a closed position, said control means being directly connected to said first power transmitting means and solely responsive to implement torque demand for moving said positioning means in said last-mentioned direction, said control means including means for adjusting the closed position of said blades to vary the low capacity of said torque converter.

28. In combination in a vehicle, a working implement and a vehicle drive, a transmission having first power transmitting means for transmitting power to said implement and second power transmitting means for transmitting power to said vehicle drive, a power plant for said transmission, power transmission capacity control means operatively connected to said second power transmitting means and directly connected to said first power transmitting means and responsive to a torque-demand signal directly from said working implement to reduce the power transmitting capacity of said second power transmitting means and enable said power plant to simultaneously drive said vehicle and implement without substantial reduction in power plant speed.

29. In combination in a vehicle, a working implement and a vehicle drive, a power plant, a transmission having first power transmitting means for transmitting power from said power plant to said implement and second power transmitting means for transmitting power from said power plant to said vehicle drive, said second power transmitting means including a variable-capacity torque converter having variable pitch stator blades, capacity control means operatively connected to said converter and directly to said first power transmitting means and responsive to torque demand signal directly from said working implement and unaffected by power plant speed to lower the capacity of the converter to enable said power plant to simultaneously drive said implement and vehicle drive without substantial reduction in full power plant speed.

30. In a vehicle having a power plant, a vehicle drive and a working implement, a transmission, said transmission providing a first power path to the vehicle drive and a second power path to the implement, said transmission including power control means in said first power path operative to control the power being transmitted thereby, means connected to said second power path and responsive to implement torque demand and unaffected by power plant speed and operatively connected to said power control means in said first power path to reduce the power being transmitted in response to increased torque demand of said implement drive.

31. In combination in a vehicle having a substantially constant-speed power plant for driving an implement and a vehicle drive transmission, a hydrodynamic torque converter forming part of said transmission, said torque converter having pump and turbine units and including a stator having a plurality of blades for directing circulating fluid in said converter from said turbine to said pump, said stator blades being movable between high and low-angle positions for varying the torque-absorption capacity of said converter, a motor for moving said stator blades between said high and low-angle positions, said stator providing a housing for said motor, said motor dividing said housing into a plurality of chambers and with one of said chambers being a control chamber, fluid-conducting means connecting said control chamber to a source of fluid pressure, a control valve interposed in said conducting means for regulating pressure into said control chamber, said motor turning said blades to a high-angle position when said pressure in said control chamber is regulated and turning said blades to a low angle position when said control chamber is exhausted, said control valve including a spool member for controlling fluid from said source, a regulating spring biasing said spool in one direction, an end chamber in said control valve receiving the other end of said spool member, fluid-conducting means connecting said source to said end chamber to allow source pressure to move said spool member to exhaust said one chamber, closure means for opening and closing said end chamber to exhaust, spring means for biasing said closure means in position to close said end chamber, control means for opening said closure means and said end chamber in said control valve, said end chamber when open to exhaust permitting said valve to regulate pressure to said control chamber to thereby move said blades to high angle, low-capacity positions.

32. The structure of claim 31 wherein said closure means is a ball member seated in said valve, said control means includes a plunger member formed with an extension for engaging said ball member, and operator means for moving said plunger member to unseat said ball member.

33. In a hydrodynamic torque converter, a stator including a plurality of blades movable between open and closed position to vary the capacity of said converter in accordance with the position of said blades, motor means operatively coupled to said stator blades for varying the pitch of said blades, a housing for said motor means, said housing including a control chamber, fluid pressure regulating valve means including a spool member for controlling fluid pressure in said control chamber, a control chamber in said valve means, movable means for closing said last-mentioned control chamber enabling said last-mentioned control chamber to be pressurized thereby moving the spool member to a position to change the pressure in said first-mentioned control chamber whereby said motor means and said stator blades are moved changing the capacity of said converter.

34. The converter of claim 33 wherein said movable means includes spring biased ball closure means normally seated to close said last-mentioned control chamber, said last-mentioned control chamber when pressurized actuating said spool valve to open said first-mentioned control chamber to exhaust thereby allowing converter inlet pressure on said motor means and fluid pressure on said stator blades to move said motor means toward one end of said housing and said blades to an open high-capacity position.

35. The converter of claim 33 wherein said movable means includes fluid-actuated piston means and ball closure means to close said last-mentioned chamber, said last-mentioned chamber when pressurized actuating said spool valve to open said first-mentioned control chamber to exhaust thereby allowing converter inlet pressure and fluid pressure on said stator blades to move said motor means toward one end of said housing and said stator blade to an open high-capacity position.

36. The torque converter of claim 33 wherein a spring is provided for biasing said motor means in one direction, said movable means includes a ball closure means and fluid-actuated piston means for biasing said ball closure means to close said last-mentioned chamber thereby permitting said spool to regulate a low pressure to said control chamber permitting spring pressure and converter inlet pressure to bias said motor means to a closed low-capacity position, said stator blade pressure and converter inlet pressure and spring pressure combining to define a force-curve that increases as the stator blades move from a high to a low angle thereby enabling different regulating control pressures to move said motor means and said stator blades to different angular positions.

37. In a power transmission, input power means and a plurality of output means, a variable capacity torque converter driven by said input means and drivingly connected to a first of said output means, said converter including a rotor having a plurality of bladed members shiftable between high and low angle positions with respect to the central line of said converter, fluid actuated motor means for shifting said bladed members to a low angle position to provide a high capacity converter for absorbing a high percentage of input power and driving said first output means, said motor means being operative to shift said bladed members to a high blade angle position for decreasing the capacity of said converter, and thereby make available more power for driving said second output, a source of fluid under pressure, valve means for controlling the supply of fluid from said source to said motor means, said valve means being operative to regulate the pressure of fluid supplied to said motor means, fluid pressure actuated control means for biasing said valve means, said valve means responding to the bias of said control means to disconnect said source from said motor means and to exhaust fluid therefrom.

38. In a control for a fluid pressure operated device, a source of fluid under pressure, shiftable valve means for controlling the supply of fluid from said source to said device, said valve means being operative to regulate the pressure of the fluid supplied to said device, fluid pressure actuated control means at one end of said valve means operative to bias said valve means in one direction to disconnect said source from said device and to exhaust fluid from said device, a pressure chamber formed at one end of said valve means into which said fluid pressure actuated control means extends, said chamber being operatively connected to said source, means for closing said chamber to establish a pressure chamber and open said chamber to exhaust, said valve means regulating pressure supplied to said fluid operated device up to the pressure of said source when said chamber is exhausted and exhausting fluid from said device when said chamber is closed.

39. The control of claim 38 wherein said means to close said chamber is provided by a detent, means for automatically biasing said detent into a position to close said pressure chamber from exhaust, power means operative against the bias of said last recited means to unseat said detent and open said chamber to exhaust.

40. The control defined in claim 38 wherein detent means are provided to establish said chamber, a power operated means for biasing said detent means to a position to establish said pressure chamber, said detent means being movable from said position on release thereof by said power means to thereby open said pressure chamber to exhaust.

41. In a control for a fluid pressure operated device, a source of fluid having a regulated pressure, a valve for connecting and disconnecting said source and said device, said valve including a shiftable member having means to establish a pressure chamber in said valve, means connecting said chamber and said source so that the pressure of fluid therein is operative to bias said member in one direction, means for biasing said member in an opposite direction, said member being operative in response to the opposing biasing forces to regulate the pressure of fluid supplied to said device, a control member at one end of said shiftable member, a pressure chamber for said control member, means connecting said last mentioned chamber to said source, said control member being operative when said last mentioned chamber is pressurized by said source to bias said shiftable member to a position whereby said device is open to exhaust and said source is disconnected from said device, and means for opening said last mentioned chamber to exhaust and closing said last mentioned chamber from exhaust, said last mentioned chamber when open allowing said shiftable member to regulate fluid pressure and connect said source to said device.

42. The control of claim 41, said means for opening and closing said last mentioned chamber includes a closure member and spring means for biasing said closure member to a position to close said last mentioned chamber, and means for moving said closure member against the bias of said spring means to open said last mentioned chamber to exhaust.

43. The control of claim 41 wherein said means for opening and closing said last mentioned chamber includes a closure member and a fluid pressure control means for moving said closure member to a position to close said last mentioned chamber, said closure member being moved to a position to open said last mentioned chamber by fluid pressure therein on release of fluid pressure from said last mentioned control means.

44. In a control for a fluid pressure operated device, a source of fluid under pressure, shiftable valve means for controlling supply of fluid from said source to said device, said valve means being operative to regulate the pressure of fluid supplied to said device, pressure means for biasing said valve means to a position to fully open said source to said device; a pressure chamber operatively coupled to said source to allow fluid pressure to oppose the bias of said pressure means to allow said valve means to function as a regulator valve means, a movable closure means for establishing said chamber and automatically responsive to a signal to open said chamber to exhaust thereby allowing said valve means to move to the position to fully open said source to said device.

References Cited

UNITED STATES PATENTS

| | | | |
|---|---|---|---|
| 1,995,815 | 3/1935 | Purdum | 60—52 X |
| 2,161,439 | 6/1939 | Thoma | 60—53 |
| 2,392,421 | 1/1946 | Stephens | 60—52 X |
| 2,882,684 | 4/1959 | Kelley | 60—12 X |
| 2,924,941 | 2/1960 | Snoy | 60—54 |
| 2,929,267 | 3/1960 | Wilson | 60—54 X |
| 2,932,939 | 4/1960 | Hause | 60—12 |
| 2,999,400 | 9/1961 | Kelley | 60—54 X |
| 3,033,221 | 5/1962 | Strader. | |
| 3,096,613 | 7/1963 | Winchell et al. | 60—54 X |

EDGAR W. GEOHEGAN, *Primary Examiner.*

UNITED STATES PATENT OFFICE
CERTIFICATE OF CORRECTION

Patent No. 3,358,444 December 19, 1967

Robert M. Tuck

It is hereby certified that error appears in the above numbered patent requiring correction and that the said Letters Patent should read as corrected below.

Column 1, line 52, for "When the only" read -- When only the --; column 5, line 70, strike out "which"; column 6, line 67, for "sides" read -- side --; column 7, line 13, for "26" read -- 96 --; column 8, line 40, for "blades" read -- blade --; column 10, line 7, for "output" read -- input --; column 12, line 16, after "capacity" insert -- torque --.

Signed and sealed this 25th day of February 1969.

(SEAL)
Attest:

Edward M. Fletcher, Jr.
Attesting Officer

EDWARD J. BRENNER
Commissioner of Patents